United States Patent

Dontas

[15] 3,672,192
[45] June 27, 1972

[54] SPRING RETRACTABLE CAR KEY

[72] Inventor: Vassilios Dontas, 6056 West A, West Linn, Oreg. 97202

[22] Filed: Feb. 17, 1971

[21] Appl. No.: 116,191

[52] U.S. Cl. .............................................. 70/414, 70/456 R
[51] Int. Cl. .................................... A47g 29/10, E05b 19/00
[58] Field of Search .................... 70/414, 388, 456 R; 150/40

[56] References Cited

UNITED STATES PATENTS

| 3,427,834 | 2/1969 | Tutino | 70/414 |
| 3,527,072 | 9/1970 | Demetreon | 70/414 |
| 3,315,505 | 4/1967 | Shelton | 70/456 R |

FOREIGN PATENTS OR APPLICATIONS 716,277  9/1954  Great Britain...........................70/414

Primary Examiner—Robert L. Wolfe
Attorney—Buckhorn, Klarquist & Sparkman

[57] ABSTRACT

A retractable key holder has a carriage disposed within to which a key is releasably clamped by a shoulder on a shaft threadedly engaged with such carriage and extending exteriorly of the holder. A pair of compression springs are disposed in the body of the holder in parallel relation to the key. Prongs extending from one side of the carriage are engageable with the springs. Pressure applied to an actuator carried by the shaft slides the carriage and the clamped key to an extended position causing the prongs to compress the springs and bias the key toward its retracted position.

5 Claims, 5 Drawing Figures

PATENTED JUN 27 1972 3,672,192
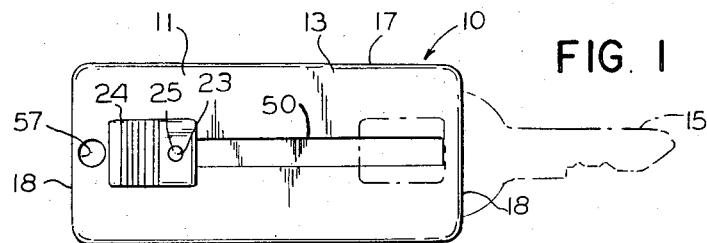
FIG. 1
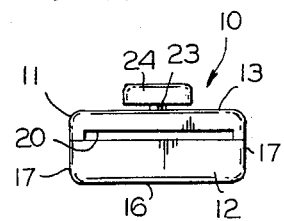
FIG. 5
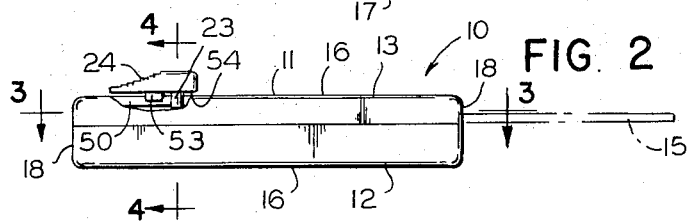
FIG. 2
FIG. 3
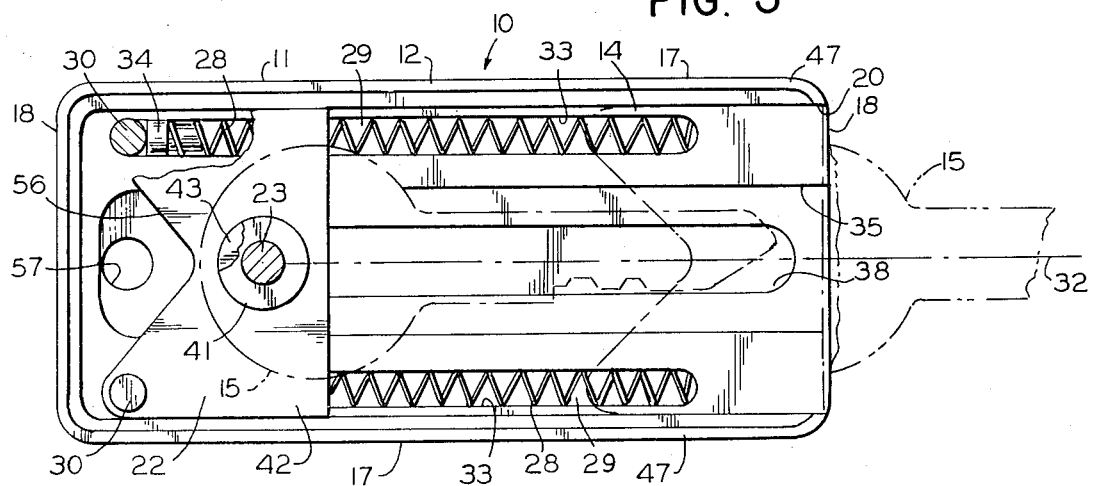
FIG. 4
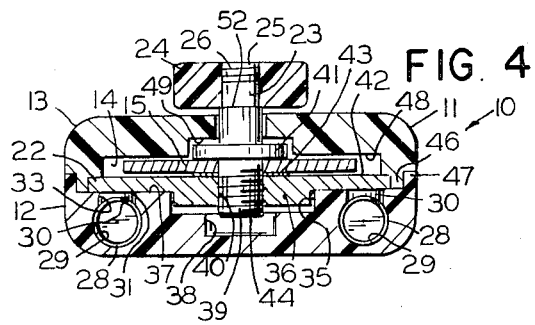
VASSILIOS K. DONTAS
*INVENTOR*
BY
BUCKHORN, BLORE, KLARQUIST & SPARKMAN
*ATTORNEYS*

SPRING RETRACTABLE CAR KEY

BACKGROUND OF THE INVENTION

This invention relates to key holders and, more particularly to holders for automobile ignition keys.

It is well known that many motorists leave their keys in the ignition lock when they leave their vehicles. This renders automobile theft easy. Police authorities, insurance companies and other groups concerned with discouraging automobile theft are concerned with the problem, and are seeking a solution.

This invention, therefore, is directed toward solving the aforesaid problem by providing an automobile ignition key holder whereby the key will automatically pop out of the ignition lock and be deposited in the motorist's hand as soon as the key is turned to its off position. Thus, the motorist will be forcibly reminded to place the key in his pocket and not leave it in the ignition of his car.

The primary object of the present invention is, therefore, to provide a device of the character described wherein the key holder will be small, compact, neat and attractive in appearance.

A further object of the present invention is to provide such a device wherein the travel of the key from its extended position to its retracted position in the holder is rendered stable such that withdrawal of the key from the ignition will be effective and foolproof.

A still further object of the present invention is to provide a holder that will exert a balanced, direct pull on the key as it is extracted from the lock, thereby to reduce the possibility that the key might be canted angularly in the lock and jammed instead of being pulled free.

SUMMARY OF THE INVENTION

The retractable key holder of the present invention includes an elongated body member having an external end abutment surface adapted to engage the face of an automobile ignition lock. The body member is hollow and contains provision for retaining the key for the lock. As is characteristic of devices of this type, the key is longitudinally movable from a retracted position entirely within the body member to an extended position projecting outwardly therefrom through an aperture formed in the aforesaid end abutment surface.

Carriage means are disposed within the body member and are slidable between a first position corresponding to the retracted position of the key and a second position corresponding to the extended position of the key.

The key holder further comprises clamping means for clamping the key to the carriage means. A pair of compression springs are disposed in the body member in parallel relation to the key, the springs being positioned equidistantly of the longitudinal centerline of the body member and on one side of the carriage means.

Spring engaging means are disposed on the carriage means and are engageable with the compression springs. A rigid operating member is attached to the carriage means and extends exteriorly of the body member. Pressure applied to the operating member to slide the carriage means from its first position to its second position causes the spring-engaging means to compress the springs and bias the key from its resulting extended position toward its retracted position.

BRIEF DESCRIPTION OF THE DRAWINGS

FIG. 1 is a top or plan view of the key holder of the present invention, the phantom lines indicating the position of the key in its extended position.

FIG. 2 is a side elevational view, with parts broken away of the key holder illustrated in FIG. 1.

FIG. 3 is a sectional view to an enlarged scale taken on line 3—3 of FIG. 2.

FIG. 4 is a sectional view to the same scale as FIG. 3 taken on line 4—4 of FIG. 2.

FIG. 5 is an end view of the key holder.

DESCRIPTION OF THE PREFERRED EMBODIMENT

Referring to the drawings, the retractable key holder 10 of the present invention includes a body member or case 11 formed of a base portion 12 and a cover portion 13 which mate to form a hollow interior 14 into which an automobile key 15 is receivable. The body member 11 has parallel flat opposite sides 16 bounded by parallel opposite side edges 17 and opposite end edges 18. One of the end edges 19 is provided with an aperture 20 through which the key 15 is movable inwardly and outwardly of the case.

A slideable carriage 22 is disposed within the hollow interior 14 of the holder and the key 15 is clamped to the carriage 22 by an operating shaft 23 threadedly attached to the carriage 22 and extendable exteriorly of the case.

A tapered actuator 24 is press-fit onto the upper portion 25 of the shaft 23, being received on friction grooves 26. Pressure applied to the shaft 23 by means of the actuator 24 thus slides the key 15 and carriage 22 from a first or retracted position within the case to a second or extended position as shown in the phantom lines in FIGS. 1–3.

Springs 28 received in longitudinally extending bores 29 in the base portion 12 of the case 11 are engaged by a pair of prongs 30 extending from the lower side 31 of the carriage 22, each of the prongs 30 being engageable with a respective one of the springs 28. Thus as the carriage and key are moved to their extended positions, the prongs 30 engage the springs 28 to compress the same and bias the key 15 from its extended position toward its retracted position.

The base portion 12 of the case is generally rectangular in shape. The longitudinally extending bores 29 are positioned equidistantly of the longitudinal centerline 32 and are parallel to the lower side 31 of the carriage 22. Each of the bores 29 extends substantially the full length of the case, but each is closed at its ends. The upper portion of each bore 29 is slotted through, as at 33, to a width less than that of the diameter thereof to retain the springs therein and yet permit the prongs 30 to contact the ends thereof. Each of the springs 28 is provided with a stop 34 at its end against which the prongs 30 may bear during the aforesaid compression.

The base portion 12 of the holder is provided with a longitudinally centered recess 35 to accommodate a key or guide 36 on the carriage 22, thereby precisely to guide the latter as it slides on the upper surface 37 of the base portion 12 from the first to its second positions heretofore described. The base portion 12 is further provided with an additional longitudinally centered clearance slot 38 to provide necessary clearance for the threaded end 39 of the shaft 23.

As mentioned previously, the carriage 22 is provided with two depending prongs 30 from its lower surface 31, which prongs 30 are adapted to contact the stops 34 positioned at the ends of the springs 28. Further depending from the lower surface 31 of the carriage 22 is the aforementioned key or guide 36 which is receivable in the recess 35 and which serves more precisely to guide the carriage 22 along the base portion 12.

The carriage 22 is provided with a threaded aperture 40 to receive the threaded end 39 of the shaft 23. The latter is also provided with an annular integral shoulder 41 approximately midway of its length. The key 15 is received between the upper surface 42 of the carriage 22 and the shoulder 41. A fiber washer 43 is placed on the upper surface 42 and the shaft 23 is screwed into the aperture 40 snugly to retain the key 15 between the shoulder 41 and the surface 42. The bottom 44 of the shaft 23 is provided with a slot so that the key may be clamped between the shoulder 41 and the surface 42.

The cover portion 13 is provided with a downwardly depending peripheral flange 46 adapted to mate with a corresponding upwardly projecting lip 47 on the periphery of the base portion 12 in an interference fit. The cover portion 13 is further provided with a longitudinally centered recess 48 to receive the key 15. A further longitudinally centered recess 49 is provided to receive the shoulder 41 on the shaft 23. Additionally the cover portion is slotted as at 50 through which slot 50 the upper portion 25 of the shaft 23 extends and along which slot the actuator 24 may travel.

The upper portion 25 of the shaft 23 further is stepped to form a shoulder 52 against which the actuator 24 may bottom. The actuator 24 itself is provided with a projection 53 on its lower surface 54 to ride in the slot 50 so as to stabilize its travel as the key and carriage are moved against the pressure provided by the springs 28.

The carriage 22 is plan form is cut to form a V trailing edge 56 so that a key chain (not shown) may be passed through access holes 57 formed in the base and upper portions of the case 11.

In operation, the device is placed adjacent the ignition switch of an automobile. The driver moves the actuator 24 toward the right hand side of the device as shown in the drawings, thereby causing the key 15 to slide outwardly of the case 11 and into the ignition switch. Since an automobile key cannot be withdrawn from the ignition lock when the key is turned to the "on" position, the retracting pressure exerted by the springs 28 causes the end abutment surface 19 of the case to bear against the face of the lock, snugly retaining the assembly in position. When the key is turned to the "off" position, it is readily retracted outwardly from the switch.

The provision of the carriage 22 in combination with the equidistant spacing of the compression springs 28 parallel to the line of travel of the key 15 results in a smooth stable withdrawal of the key from the lock. The resultant automatic withdrawal leaves the key and the case free in the hand, and the driver is thus forcibly reminded that he should take the key with him when he leaves the vehicle.

The provision of the key or guide 36 on the lower surface 31 of the carriage provides for a smooth travel thereof within the body of the holder. The location of the prongs 30 equidistantly of the longitudinal centerline 32 and their action on the two parallel springs 28 further provides for a balanced direct pull on the key in extracting the same from the lock. The resulting assembly thus provides a smoothly operating device which will reliably insure the retraction of the key 15 from the lock each time the ignition is turned off.

While various changes may be made in the detailed construction, it is to be understood that such changes will be within the spirit and scope of the present invention as it is defined by the following appended claims.

I claim:

1. In a retractable key holder including an elongated body member having an external end abutment surface adapted to engage the face of a lock, said body member being hollow and containing a key for said lock, said key being longitudinally movable from a retracted position entirely within said body member to an extended position projecting outwardly from said body member through an aperture formed in said end abutment surface, carriage means disposed within said body member and slidable between a first position corresponding to said retracted position of said key and a second position corresponding to said extended position of said key;

clamping means for clamping said key to said carriage means;

a pair of compression springs disposed in said body member in parallel relation to said key, said springs being positioned equidistantly of the longitudinal centerline of said body member and on one side of said carriage means;

spring engaging means disposed on said carriage means and engageable with said compression springs; and a rigid operating member attached to said carriage means and extending exteriorly of said body member, whereby pressure applied to said operating member to slide said carriage means from said first position to said second position causes said spring engaging means to compress said springs and bias said key from its resulting extended position towards its retracted position.

2. A retractable key holder as in claim 1 in which said operating member comprises a shaft threadedly received in said carriage means.

3. A retractable key holder as in claim 2 in which said clamping means comprises a shoulder on said shaft, said key being releasably clamped between said shoulder and said carriage means as said shaft is threadedly engaged with said carriage means.

4. A retractable key holder as in claim 1 in which said spring engaging means comprise a pair of prongs extending from said one side of said carriage means, each of said prongs being engageable with a respective one of said compression springs.

5. A retractable key holder as in claim 1 in which said operating member is attached to said carriage means on the other side thereof.

* * * * *